(12) United States Patent
Shimizu

(10) Patent No.: US 8,727,743 B2
(45) Date of Patent: May 20, 2014

(54) OPPOSING SWASH PLATE PISTON PUMP/MOTOR

(75) Inventor: Takeo Shimizu, Sagamihara (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 13/537,222

(22) Filed: Jun. 29, 2012

(65) Prior Publication Data

US 2012/0269656 A1 Oct. 25, 2012

Related U.S. Application Data

(62) Division of application No. 12/531,464, filed as application No. PCT/JP2008/055176 on Mar. 14, 2008, now Pat. No. 8,235,681.

(30) Foreign Application Priority Data

Mar. 16, 2007 (JP) .................................. 2007-68157

(51) Int. Cl.
*F04B 1/32* (2006.01)
(52) U.S. Cl.
CPC ..................................... *F04B 1/324* (2013.01)
USPC ............................. 417/269; 417/270; 417/271
(58) Field of Classification Search
CPC ....................................................... F04B 1/324
USPC ............ 417/269–271; 91/499, 501, 505, 506, 91/12.1, 12.2, 13
See application file for complete search history.

(56) References Cited

U.S. PATENT DOCUMENTS

| 2,957,462 | A | | 10/1960 | Clark | |
| 3,052,098 | A | * | 9/1962 | Ebert | 60/492 |
| 3,126,707 | A | | 3/1964 | Hann et al. | |
| 3,213,619 | A | | 10/1965 | Creighton et al. | |
| 3,291,068 | A | * | 12/1966 | Wiggermann | 91/500 |
| 3,757,525 | A | | 9/1973 | Rusch et al. | |
| 4,487,108 | A | * | 12/1984 | McLuen | 91/504 |
| 4,624,175 | A | | 11/1986 | Wahlmark | |
| 2005/0123412 | A1 | | 6/2005 | Shimizu | |

FOREIGN PATENT DOCUMENTS

| AT | 226547 | 3/1963 |
| DE | 22 52 355 | 5/1973 |
| DE | 195 16 215 A1 | 9/1995 |
| GB | 709183 A | 5/1954 |
| JP | 147604/1974 | 12/1974 |
| JP | 55-153872 A | 12/1980 |
| JP | 11-247990 A | 9/1999 |
| JP | 2003-49763 | 2/2003 |
| JP | 2005-105898 A | 4/2005 |

* cited by examiner

*Primary Examiner* — Christopher Bobish
(74) *Attorney, Agent, or Firm* — Rabin & Berdo, P.C.

(57) ABSTRACT

A first swash plate (30) and a second swash plate (40) are disposed on either side of a cylinder block (4), and a plurality of cylinders (6) are disposed in the cylinder block (4). A first piston (8) and a second piston (9) are inserted opposite to each other in each cylinder (6) such that the first piston (8) slides on the first swash plate (30) and the second piston (9) slides on the second swash plate (40). By providing a servo mechanism (33) that tilts the first swash plate (30) and a tilt linking mechanism (40, 70) that tilts the second swash plate (40) in conjunction with the tilting of the first swash plate (30), tilt angles of the two swash plates (30, 40) can be controlled by the single servo mechanism (33).

7 Claims, 8 Drawing Sheets

OPPOSING SWASH PLATE PISTON PUMP/MOTOR

This is a Divisional of U.S. application Ser. No. 12/531,464, filed on Sep. 15, 2009, and allowed on May 29, 2012, the subject matter of which is incorporated herein by reference.

FIELD OF THE INVENTION

This invention relates to capacity control of an opposing swash plate hydraulic pump/motor in which a first swash plate and a second swash plate are disposed on either side of a cylinder block to face each other.

BACKGROUND OF THE INVENTION

JPH11-247990A, published by the Japan Patent Office in 1999, discloses a hydraulic servo mechanism that varies a swash plate tilt angle to vary a capacity of a swash plate hydraulic pump.

JP2005-105898A, published by the Japan Patent Office in 2005, discloses an opposing swash plate hydraulic pump/motor in which a first swash plate and a second swash plate are disposed on either side of a cylinder block to face each other. A first piston that contacts the first swash plate in a state where it is free to slide and a second piston that contacts the second swash plate in a state where it is free to slide, are housed in respective cylinders of the cylinder block.

In accordance with rotation of the cylinder block, the first piston is driven in an axial direction by the first swash plate and the second piston is driven in the axial direction by the second swash plate, and thus the first piston and second piston reciprocate within the cylinder. By varying the tilt angles of the two swash plates, the capacity can be varied more widely than in a hydraulic pump/motor that uses a single swash plate.

SUMMARY OF THE INVENTION

When a servo mechanism such as that disclosed in aforesaid JPH11-247990A is used in an opposing swash plate piston pump/motor, naturally two servo mechanisms are required to control the tilt angle of the first swash plate and the tilt angle of the second swash plate. Although an opposing swash plate hydraulic pump/motor is capable of greater capacity variation than a single swash plate hydraulic pump/motor, a large increase in the manufacturing cost thereof is inevitable for the above reason.

It is therefore an object of this invention to realize control of the tilt angles of two swash plates provided in an opposing swash plate piston pump/motor through a simple construction.

To achieve the above object, this invention provides an opposing swash plate piston pump/motor in which a first swash plate and a second swash plate are disposed on either side of a cylinder block, a plurality of cylinders are disposed in the cylinder block on a circumference centering on a central axis of the cylinder block and parallel to the central axis of the cylinder block, a first piston and a second piston are inserted opposite to each other in each cylinder, the first piston slides on the first swash plate, and the second piston slides on the second swash plate such that the first piston and the second piston enlarge and reduce the cylinder.

The piston pump/motor comprises a servo mechanism that tilts the first swash plate; and a tilt linking mechanism that tilts the second swash plate in conjunction with tilting of the first swash plate.

The details as well as other features and advantages of this invention are set forth in the remainder of the specification and are shown in the accompanying drawings.

DESCRIPTION OF THE PREFERRED EMBODIMENTS

An embodiment in which this invention is applied to a hydrostatic transmission (to be abbreviated to HST hereafter) used as a continuously variable transmission for a working vehicle will be described below.

Figure 1:
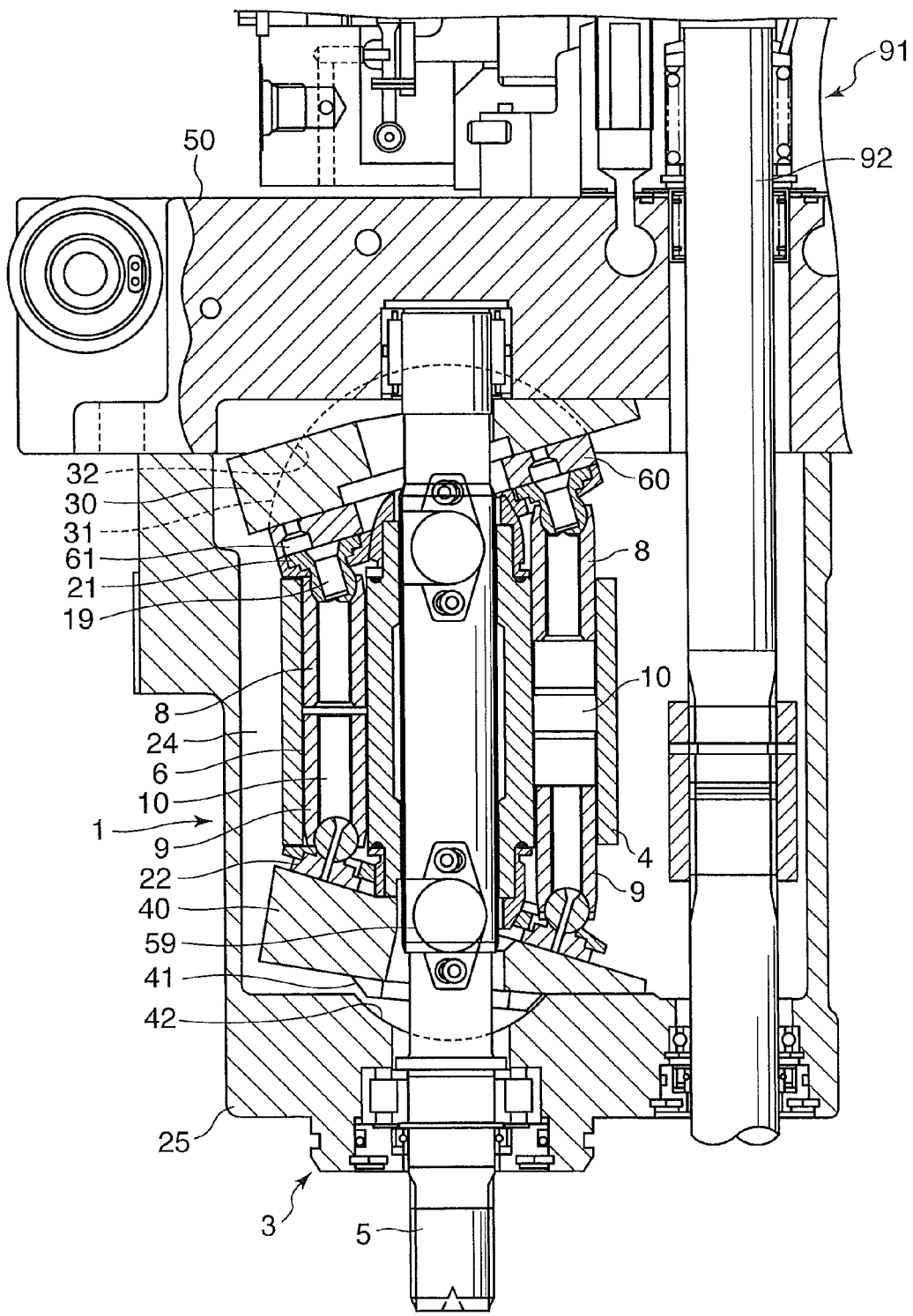
FIG. 1 is a longitudinal sectional view of essential parts of an HST equipped with an opposing swash plate piston motor according to this invention.

Referring to FIG. 1 of the drawings, an HST 3 comprises a variable capacity hydraulic piston pump 91 and a variable capacity hydraulic piston motor 1. The piston pump 91 is driven to rotate by an internal combustion engine via a pump shaft 92. The piston motor 1 is driven to rotate by working oil pumped by the piston pump 91. The rotation of a motor shaft 5 of the piston motor 1 is transmitted to left and right drive wheels of the working vehicle via a gear such as a differential.

The piston motor 1 is constituted by an opposing swash plate hydraulic motor in which a first swash plate 30 and a second swash plate 40 are provided on either side of a cylinder block 4. The structure of the opposing swash plate hydraulic pump/motor is known from JP2005-105898A, described above.

The piston motor 1 comprises a case 25 and a port block 50 that seals the case 25. An operating chamber 24 is formed on the inside of the case 25 sealed by the port block 50. The cylinder block 4, first swash plate 30, and second swash plate 40 are housed in the operating chamber 24.

The cylinder block 4 is fixed to an outer periphery of the motor shaft 5, which is supported by the case 25 and the port block 50 to be free to rotate, and rotates integrally with the motor shaft 5. A plurality of cylinders 6 are formed to penetrate the cylinder block 4 in an axial direction. The cylinders 6 are formed at equal angular intervals in a rotation direction of the cylinder block 4. A first piston 8 and a second piston 9 are inserted into the inside of the respective cylinders 6 from opening portions in either end of the cylinder 6. A volume chamber 10 is defined by the pistons 8 and 9 on the inside of the cylinder 6.

The first piston 8 and second piston 9 project axially outward from the respective end faces of the cylinder block 4. A shoe 21 is attached to a projecting end of the first piston 8. A shoe 22 is attached to a projecting end of the second piston 9. The shoe 21 slides on the first swash plate 30 via a port plate 60. The shoe 22 directly slides on the second swash plate 40. The port plate 60 is a disc-shaped member that latches the shoe 21 of each cylinder 6 to be capable of sliding within a predetermined range, and contacts the swash plate 30 to be free to slide in the rotation direction.

When the cylinder block 4 rotates, the first piston 8 rotates together with the port plate 60 and the shoe 21, and an axial direction force generated by the port plate 60 that rotates while sliding over the first swash plate 30 causes the first piston 8 to reciprocate within the cylinder 6.

The second piston 9 rotates while causing the shoe 22 to slide over the second swash plate 40, and an axial direction force generated by the second swash plate 40 causes the second piston 9 to reciprocate within the cylinder 6.

The pistons 8 and 9 reciprocating within the cylinder 6 enlarge and reduce the volume chamber 10 in the cylinder 6. It should be noted that a tilt direction of the first swash plate 30 and the tilt direction of the second swash plate 40 are set in advance such that when the first piston 8 reaches a maximum contraction position, the second piston 9 reaches the maximum contraction position simultaneously, and when the first piston 8 reaches a maximum expansion position, the second piston 9 reaches the maximum expansion position simultaneously.

Figure 2:
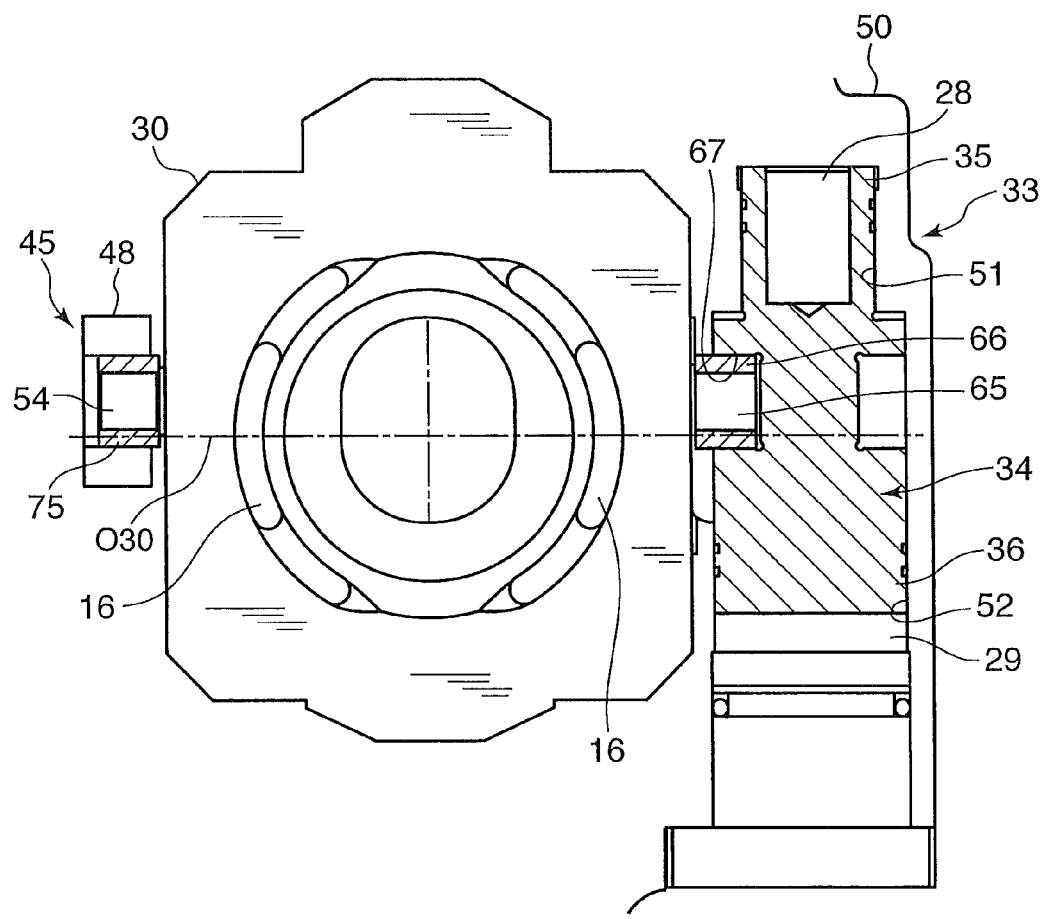
FIG. 2 is a front view of a first swash plate, including a cross-sectional view of a tilt linking mechanism and a longitudinal sectional view of a servo mechanism, according to this invention.

An oil passage for supplying the working oil to the volume chamber 10 in each cylinder 6 and an oil passage for discharging the working oil from the volume chamber 10 are formed in the first swash plate 30, shown in FIG. 2, as a pair of ports 16. The pair of ports 16 communicate with the volume chamber 10 selectively in accordance with a rotation position of the cylinder 6 via valve ports 61, which are formed in the port plate 60 in an identical number to the number of cylinders 6, and a port 19 formed in the shoe 21.

Figure 3:
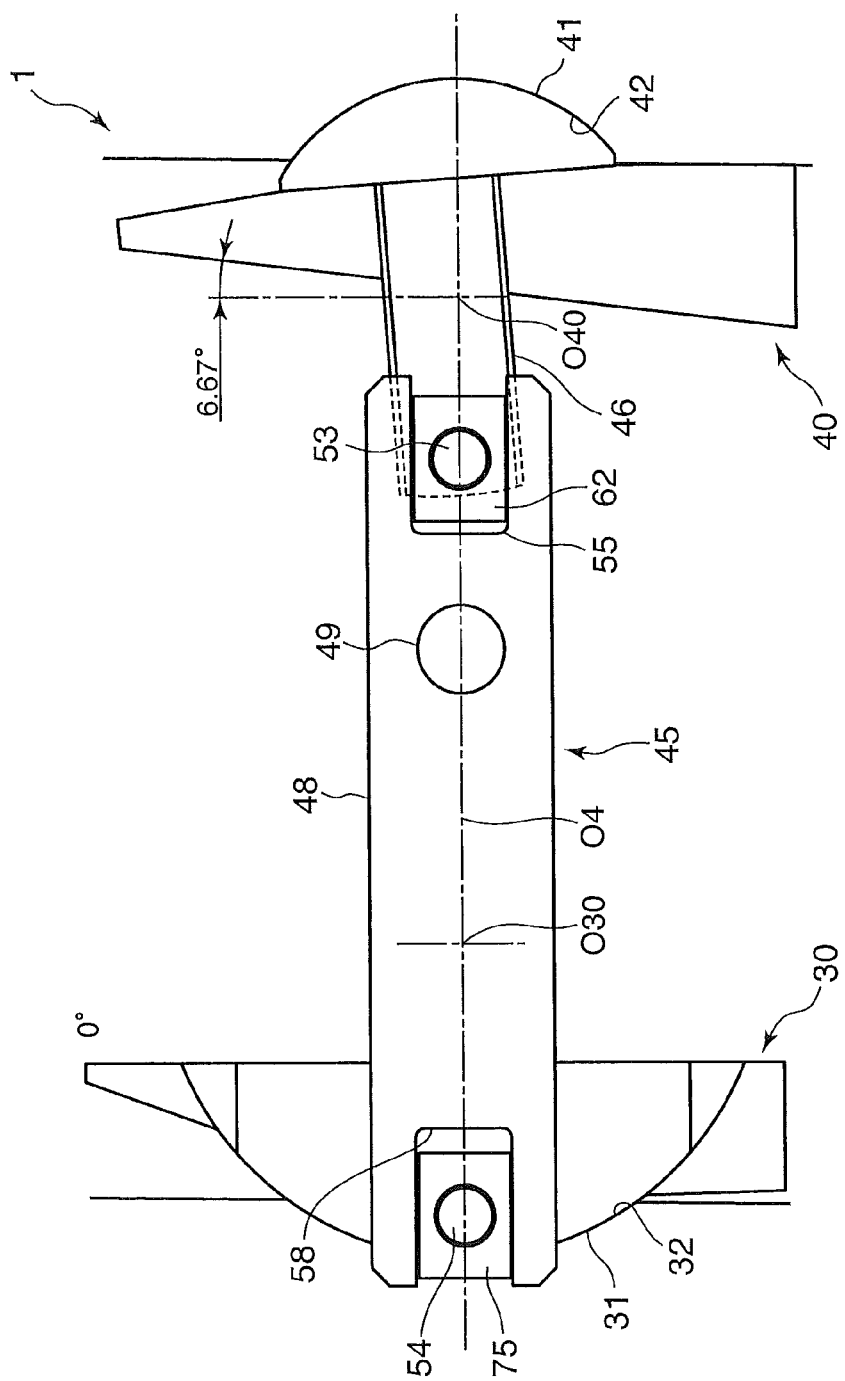
FIG. 3 is a side view of the tilt linking mechanism.

Referring to FIG. 3, the first swash plate 30 comprises a back surface journal portion 31 having a sliding surface with a half log-shaped cross-section. A first recessed bearing 32 that supports the back surface journal portion 31 to be free to slide along the sliding surface is provided in the port block 50. The second swash plate 40 comprises a back surface journal portion 41 having a half log-shaped sliding surface. A second recessed bearing 42 that supports the back surface journal portion 41 to be free to slide along the sliding surface is provided in the case 25. The pair of ports 16 communicate constantly with a pair of bearing ports formed in the first recessed bearing 32, and are connected to a pump passage and an intake passage of the piston pump 91 from the bearing ports via an oil passage that penetrates the port block 50.

The piston motor 1 operates in the following manner.

Pressurized working oil in the pump passage of the piston pump 91 is dispatched from one of the bearing ports to the volume chamber 10 of the cylinder 6 via one of the ports 16, the valve port 61, and the shoe port 19. The working oil causes the volume chamber 10 to expand such that the first piston 8 and second piston 9 are respective driven in an expansion direction. The cylinder block 4 is rotated by a rotary torque applied to the expanding first piston 8 by the first swash plate 30 and a rotary torque applied to the expanding second piston 9 by the second swash plate 40.

After the first piston 8 and second piston 9 reach the maximum expansion position, the first piston 8, which is rotating while being guided by the first swash plate 30, and the second piston 9, which is rotating while being guided by the second swash plate 40, respectively displace in a direction for causing the volume chamber 10 to contract. Accordingly, the working oil in the volume chamber 10 is discharged via the shoe port 19, the valve port 61, the other port 16, and the other bearing port, and suctioned into the intake passage of the piston pump 91.

To make the capacity of the piston motor 1, or in other words a displacement volume per reciprocation of the first piston 8 and second piston 9, variable, the HST 3 comprises a servo mechanism 33 shown in FIG. 2 that varies the tilt angle of the first swash plate 30 and the tilt angle of the second swash plate 40. The tilt angle of the first swash plate 30 is varied by causing the back surface journal portion 31 of the first swash plate 30 to slide along the sliding surface having the half log-shaped cross-section relative to the first recessed bearing 32. The tilt angle of the second swash plate 40 is varied by causing the back surface journal portion 41 of the second swash plate 40 to slide along the sliding surface having the half log-shaped cross-section relative to the second recessed bearing 42.

During an operation of the HST 3, the working oil that is pumped from the piston pump 91 drives the piston motor 1 to rotate in the manner described above. By varying the respective tilt angles of the first swash plate 30 and second swash plate 40 of the piston motor 1, the capacity of the piston motor 1 varies. By varying the capacity of the piston motor 1 in this manner, a rotation speed ratio between the pump shaft 92 of the piston pump 91 and the motor shaft 5 of the piston motor 1 varies.

A variable capacity ratio of the piston motor 1, which is an opposing swash plate hydraulic motor, from a maximum capacity to a minimum capacity can be set at approximately double that of a conventional non-opposing swash plate hydraulic pump, and therefore a shift range of the HST 3 can be set widely.

The piston motor 1 according to this invention further comprises a structure for varying the tilt angle of the first swash plate 30 and the tilt angle of the second swash plate 40 using the single servo mechanism 33.

Referring to FIG. 2, the structure of the servo mechanism 33 will be described.

The servo mechanism 33 comprises a servo regulator piston 34 which slides in the port block 50. The first swash plate 30 comprises a driving engagement pin 65 that projects sideward. A slide metal 66 is attached to the driving engagement pin 65. A recessed portion 67 that allows the slide metal 66 to slide therein is formed in the servo regulator piston 34. When the servo regulator piston 34 displaces in the axial direction in accordance with an oil pressure, a force for causing the back surface journal portion 31 to slide relative to the first recessed bearing 32 is applied to the first swash plate 30 via the driving engagement pin 65 and the slide metal 66, and as a result, the tilt angle of the first swash plate 30 varies.

Cylinder portions 51 and 52 are formed continuously and coaxially in the port block 50. The servo regulator piston 34 is constituted by a piston portion 35 that slides in the cylinder portion 51 and a piston portion 36 that slides in the cylinder portion 52. A hydraulic chamber 28 facing the piston portion 35 is formed inside the cylinder portion 51. A hydraulic chamber 29 facing the piston portion 36 is formed inside the cylinder portion 52. A diameter of the cylinder portion 51 is smaller than a diameter of the cylinder portion 52, and a pressure-receiving surface area of the piston portion 35 is smaller than a pressure-receiving surface area of the piston portion 36.

Oil pressure is led to the first hydraulic chamber 28 from an oil pressure source. Oil pressure is led to the second hydraulic chamber 29 from the oil pressure source via a proportional electromagnetic pressure reducing valve. A stroke position of the servo regulator piston 34 varies in accordance with the oil pressure led to the hydraulic chamber 29. When the oil pressure led to the first hydraulic chamber 28 and the oil pressure led to the second hydraulic chamber 29 are equal, the servo regulator piston 34 is positioned on one stroke end, as shown in FIG. 2, by a pressure-receiving surface area difference between the piston portions 35 and 36. When the oil pressure led to the second hydraulic chamber 29 is reduced to a predetermined value, the servo regulator piston 34 moves to the other stroke end.

The oil pressure source comprises a shuttle valve that extracts a pumping pressure of the hydraulic piston pump 91 of the HST 3, and a pressure reducing valve that reduces oil pressure led from the shuttle valve to a predetermined value.

Movement of the servo regulator piston 34 is transmitted to the first swash plate 30 via the slide metal 66 and the driving engagement pin 65.

Referring to FIG. 3, the piston motor 1 comprises a tilt linking mechanism 45 that links the first swash plate 30 and the second swash plate 40. The tilt linking mechanism 45 comprises a rocking link 48 supported so as to be free to rock by a support pin 49 fixed to the case 25, a first engagement pin 54 that engages the first swash plate 30 to one end of the rocking link 48, and a second engagement pin 53 that engages the second swash plate 40 to another end of the rocking link 48.

The first engagement pin 54 is engaged to a notch 58, which is formed in one end of the rocking link 48, via a slide metal 75 to be capable of sliding in an axial direction of the rocking link 48. As shown in FIG. 2, the first engagement pin 54 projects sideward from the first swash plate 30.

The second engagement pin 53 is engaged to a notch 55, which is formed in the other end of the rocking link 48, via a slide metal 62 to be capable of sliding in the axial direction of the rocking link 48.

The second engagement pin 53 projects sideward from an arm 46 which projects toward the first swash plate 30 from the second swash plate 40. Respective central axes of the second engagement pin 53, the first engagement pin 54, and the driving engagement pin 65 shown in FIG. 2 are parallel with a tilt central axis O30 of the first swash plate 30 and a tilt central axis O40 of the second swash plate 40.

Referring back to FIG. 2, the servo mechanism 33 and the tilt linking mechanism 45 are disposed so as to sandwich the first swash plate 30, while the driving engagement pin 65 and the first engagement pin 54 project in opposite directions from the two side faces of the first swash plate 30.

Figure 4C:
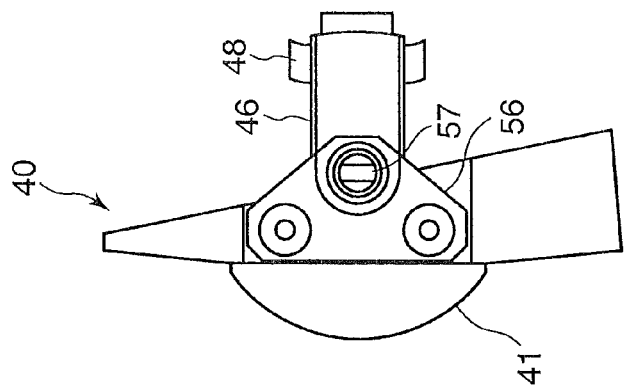
FIGS. 4A-4C are a rear view of the first swash plate and side views of the first swash plate seen from two directions.
Figure 4B:
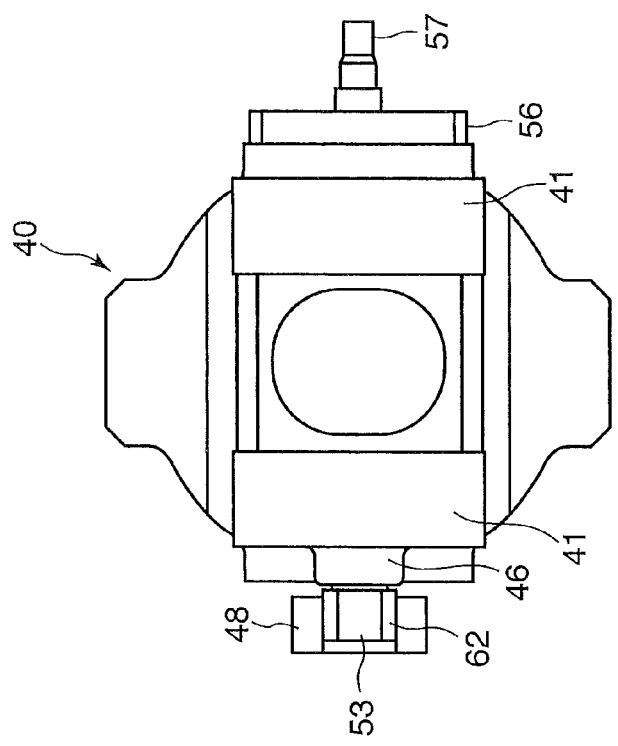
Figure 4A:
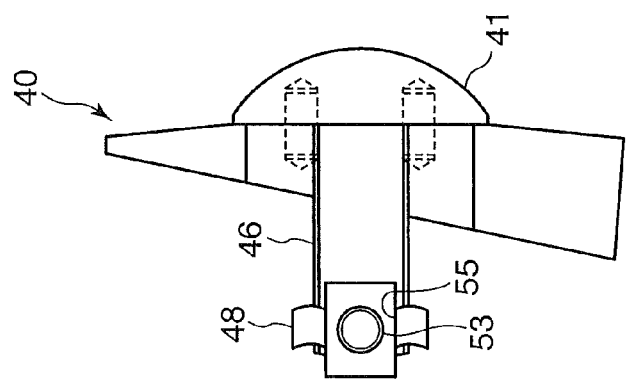

FIG. 4A is a side view showing one side of the second swash plate 40, FIG. 4B is a rear view of the second swash plate 40, and FIG. 4C is a side view showing the other side of the second swash plate 40. As shown in FIGS. 4A and 4B, the arm 46 projects in the direction of the first swash plate 30 from one side face of the second swash plate 40, and the second engagement pin 53 projects sideward from a tip end portion of the arm 46. As shown in FIG. 3, the second engagement pin 53 is disposed further toward the cylinder block 4 side than the tilt central axis O40 of the second swash plate 40.

As shown in FIGS. 4B and 4C, a sensor shaft 57 is provided on the other side face of the second swash plate 40 via a bracket 56 coaxially with the tilt central axis O40 of the second swash plate 40. A potentiometer 59 shown in FIG. 1 is attached to the sensor shaft 57. The potentiometer 59 detects the tilt angle of the second swash plate 40.

Figure 5:
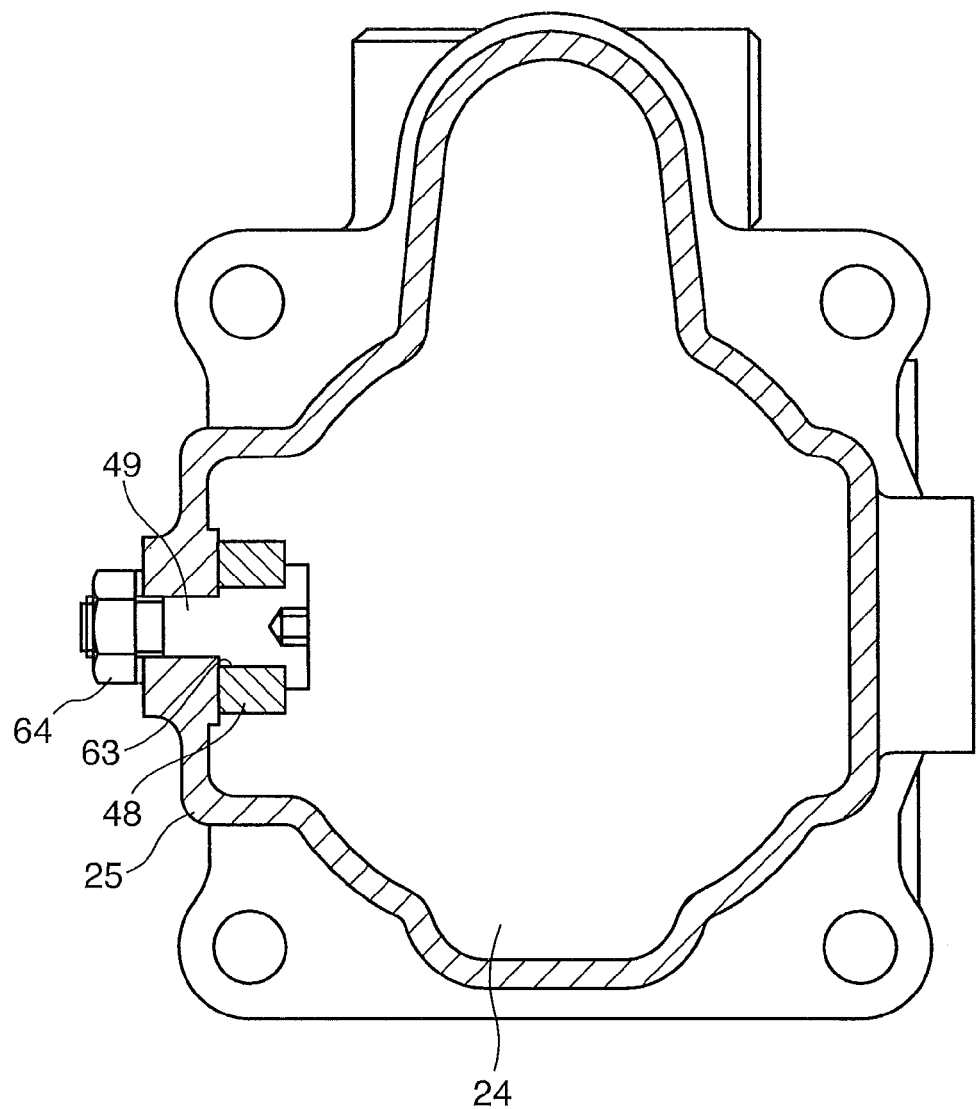
FIG. 5 is a cross-sectional view of a case.

Referring to FIG. 5, the support pin 49 that supports the rocking link 48 on the case 25 is inserted into a hole 63 formed in the rocking link 48 and fixed to the case 25 via a nut 64 such that the rocking link 48 is free to rock on the case 25 via the support pin 49.

Figure 6A:
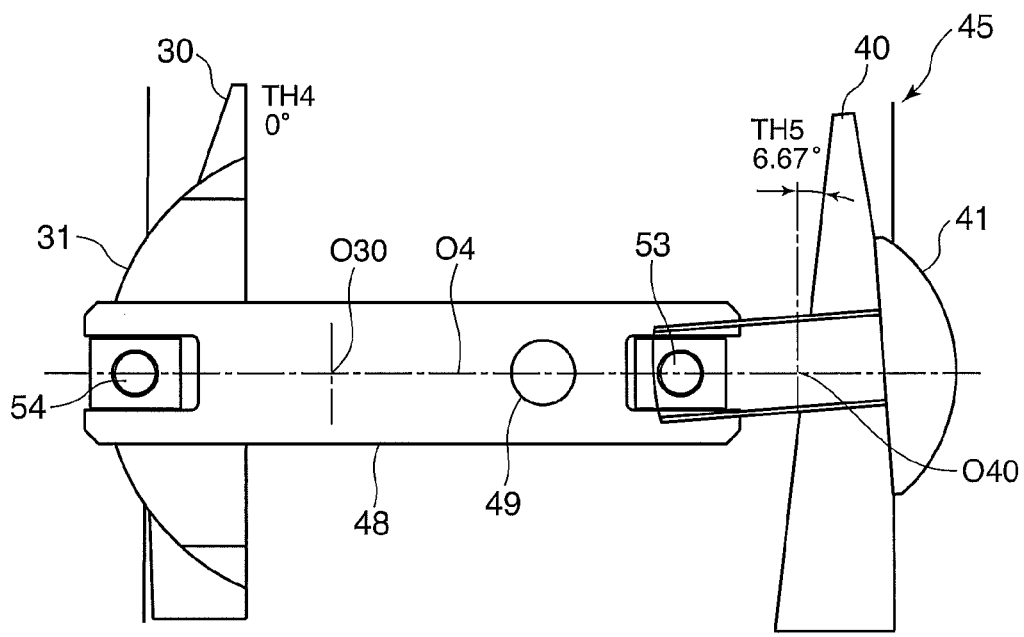
FIGS. 6A and 6B are side views of the tilt linking mechanism, illustrating an operational state of the tilt linking mechanism.

FIG. 6A shows the state of the tilt linking mechanism 45 when the piston motor 1 is in a minimum capacity state. Here, a tilt angle TH4 of the first swash plate 30 is 0 degrees and a tilt angle TH5 of the second swash plate 40 is 6.67 degrees.

Figure 6B:
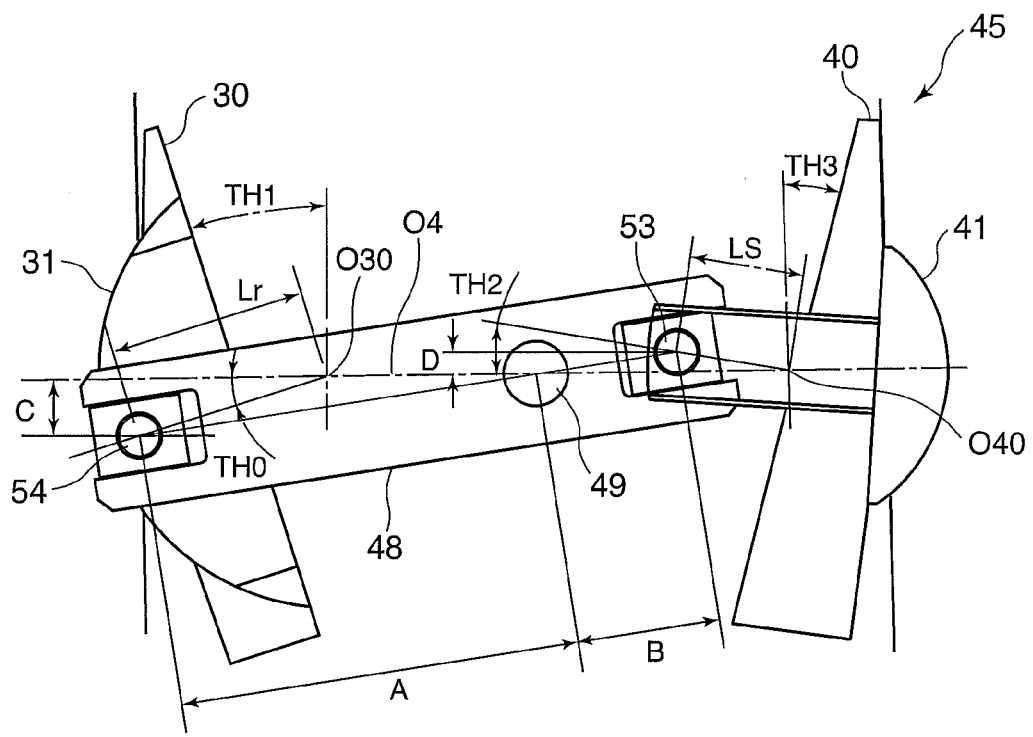

FIG. 6B shows the state of the tilt linking mechanism 45 when the piston motor 1 is in a maximum capacity state. Here, a tilt angle TH1 of the first swash plate 30 is 16.3 degrees and a tilt angle TH3 of the second swash plate 40 is 16.3 degrees.

When the stroke position of the servo regulator piston 34 of the servo mechanism 33 varies such that the first swash plate 30 tilts via the driving engagement pin 65, the second swash plate 40 tilts in conjunction with the first swash plate 30 via the tilt linking mechanism 45. The capacity of the piston motor 1 can be varied continuously from the minimum capacity state shown in FIG. 6A to the maximum capacity state shown in FIG. 6B in accordance with the stroke position of the servo regulator piston 34.

In FIG. 6A, the respective centers of the second engagement pin 53, first engagement pin 54, and support pin 49 are positioned on a rotary central axis O4 of the cylinder block 4, but as long as the dimensions of the respective portions shown in FIG. 6B satisfy following Equations (1) to (6), the second engagement pin 53, first engagement pin 54, and support pin 49 may be disposed in desired positions other than on the rotary central axis O4.

$$TH0 = TH1 - TH4 \quad (1)$$

$$TH2 = TH3 - TH5 \quad (2)$$

$$C = Lr \sin(TH0) \quad (3)$$

$$D = Ls \sin(TH2) \quad (4)$$

$$C/D = A/B \quad (5)$$

$$A/B = (Lr \sin(TH0))/(Ls \sin(TH2)) \quad (6)$$

where:
A=distance between centers of first engagement pin 54 and support pin 49;
B=distance between centers of support pin 49 and second engagement pin 53;
Lr=distance between center of first engagement pin 54 and tilt central axis O30 of first swash plate 30;
Ls=distance between center of second engagement pin 53 and tilt central axis O40 of second swash plate 40;
D=displacement distance of center of second engagement pin 53 relative to center of support pin 49 in orthogonal direction to rotary central axis O4 of cylinder block 4; and
C=displacement distance of center of first engagement pin 54 relative to center of support pin 49 in opposite direction to displacement of center of second engagement pin 53.

By employing the tilt linking mechanism 45 constructed as described above, the piston motor 1 can vary the tilt angles of the two swash plates 30 and 40 synchronously using the single servo mechanism 33, without providing two servo mechanisms and a proportional electromagnetic pressure reducing valve.

In the case of an HST used as a continuously variable transmission for a vehicle, acceleration and deceleration are conventionally performed by adjusting three servo mechanisms including a servo mechanism for driving the swash plate of the piston pump 91 and servo mechanisms for adjusting the respective tilt angles of the first swash plate 30 and second swash plate 40 of the piston motor 1. According to this HST 3, the same result can be obtained by adjusting two servo mechanisms including a servo mechanism for driving the swash plate of the piston pump 91 and the servo mechanism for the piston motor 1.

Furthermore, in this piston motor 1, the servo mechanism 33 and the tilt linking mechanism 45 are disposed so as to sandwich the first swash plate 30, and therefore the servo mechanism 33 and the tilt linking mechanism 45 can be housed compactly in the limited interior space of the case 25.

In the embodiment described above, the single servo mechanism 33 adjusts the tilt angle of the first swash plate 30, but the single servo mechanism may adjust the tilt angle of the second swash plate 40. Further, the single servo mechanism 33 may be constructed to drive the tilt linking mechanism 45 directly.

The second engagement pin 53 may be disposed on the opposite side of the tilt central axis O40 of the second swash plate 40 to the cylinder block 4, and the first engagement pin 54 may be disposed further toward the second swash plate 40 side than the tilt central axis O30 of the first swash plate 30, or in other words on the cylinder block 4 side.

Next, referring to FIGS. 7 and 8, another embodiment of this invention will be described.

In this embodiment, the first swash plate 30 and second swash plate 40 are linked via a tilt linking mechanism 70. The tilt linking mechanism 70 comprises a slide bar 71, a first engagement pin 73 that engages the first swash plate 30 with one end of the slide bar 71, and a second engagement pin 74 that engages the second swash plate 40 with another end of the slide bar 71.

The slide bar 71 is supported via a pair of guides 72 to be capable of displacing relative to the case 25 in only an orthogonal direction to a plane formed by the rotary central axis O4 of the cylinder block 4, the tilt central axis O30 of the first swash plate 30, and the tilt central axis O40 of the second swash plate 40.

The first engagement pin 73 is engaged to a notch 77, which is formed in one end of the slide bar 71, to be capable of sliding in an axial direction of the slide bar 71. The first engagement pin 73 projects sideward from the first swash plate 30. The first engagement pin 73 is positioned on the opposite side of the tilt central axis O30 of the first swash plate 30 to the cylinder block 4.

The second engagement pin 74 is engaged to a notch 78 formed in the other end of the slide bar 71 to be capable of sliding in an axial direction of the slide bar 71. The second engagement pin 74 projects sideward from an arm 76 which projects from the second swash plate 40 in an opposite direction to the first swash plate 30. The second engagement pin 74 is positioned on the opposite side of the tilt central axis O40 of the second swash plate 40 to the cylinder block 4.

The respective central axes of the first engagement pin 73, the second engagement pin 74, and the driving engagement pin 65 shown in FIG. 2 are parallel with the tilt central axis O30 of the first swash plate 30 and the tilt central axis O40 of the second swash plate 40. The first engagement pin 73 engages the first swash plate with the slide bar 71 so that the first swash plate 30 is capable of rocking with respect to the slide bar 71 and displacing in the axial direction of the slide bar 71. The second engagement pin 74 engages the second swash plate 40 with the slide bar 71 so that the second swash plate 40 is capable of rocking with respect to the slide bar 71 and displacing in the axial direction of the slide bar 71.

Figure 7:
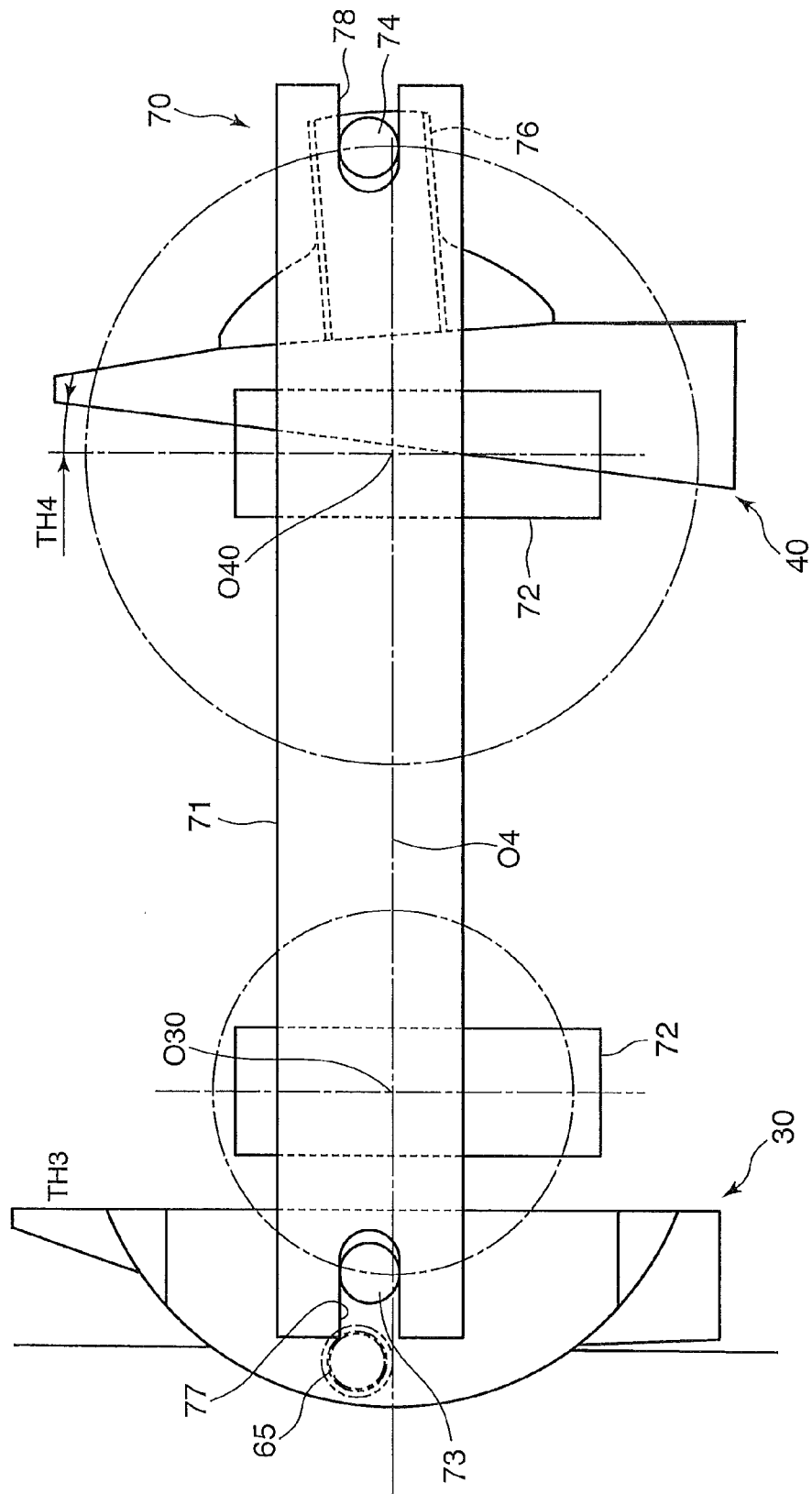
FIG. 7 is a side view of a tilt linking mechanism according to another embodiment of this invention.

FIG. 7 shows the state of the tilt linking mechanism 70 when the piston motor 1 is in the minimum capacity state. Here, a tilt angle TH3 of the first swash plate 30 is 0 degrees and a tilt angle TH4 of the second swash plate 40 is 6.67 degrees.

Figure 8:
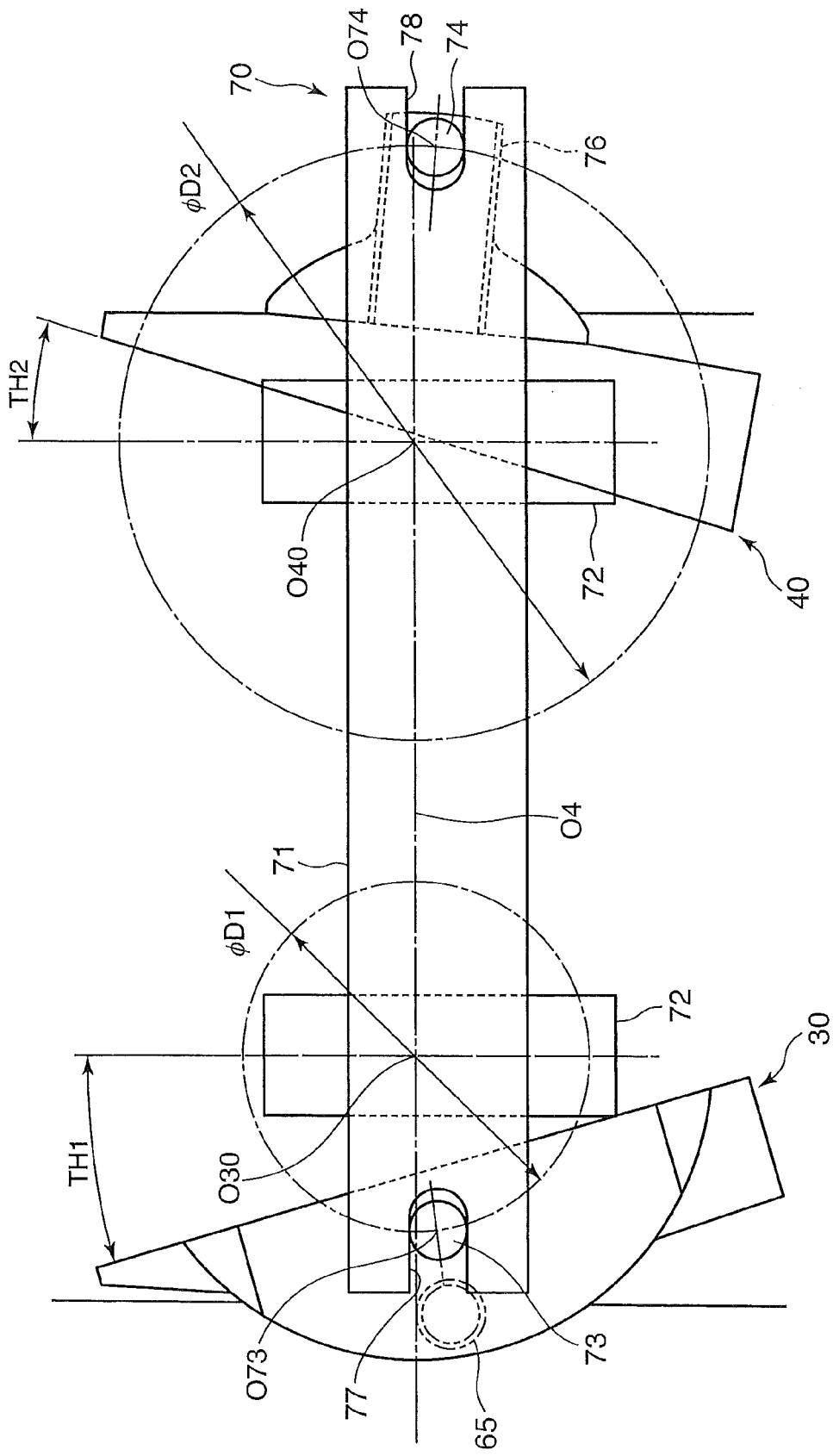
FIG. 8 is similar to FIG. 7, but shows a swash plate and the tilt linking mechanism in a maximum capacity state.

FIG. 8 shows the state of the tilt linking mechanism 70 when the piston motor 1 is in the maximum capacity state. Here, a tilt angle TH1 of the first swash plate 30 is 16.3 degrees and a tilt angle TH2 of the second swash plate 40 is 16.3 degrees.

All other constructions of the piston motor 1 are identical to the first embodiment.

When the stroke position of the servo regulator piston 34 of the servo mechanism 33 varies such that the first swash plate 30 tilts via the driving engagement pin 65, the second swash plate 40 tilts in conjunction with the first swash plate 30 via the tilt linking mechanism 70. The capacity of the piston motor 1 can be varied continuously from the minimum capacity state shown in FIG. 7 to the maximum capacity state shown in FIG. 8 in accordance with the stroke position of the servo regulator piston 34.

To tilt the first swash plate 30 and second swash plate 40, the first engagement pin 73 and second engagement pin 74 are disposed in positions that are commensurate with respective tilt angle ranges of the first swash plate 30 and second swash plate 40. Therefore, the dimensions of the respective portions of the tilt linking mechanism 70 shown in FIG. 8 are set to satisfy a following Equation (7).

$$D2/D1=(TH1-TH3)/(TH2-TH4) \quad (7)$$

where:

D1=diameter of displacement trajectory of center O73 of first engagement pin 73 about tilt central axis O30 of first swash plate 30;

D2=diameter of displacement trajectory of center O74 of second engagement pin 74 about tilt central axis O40 of second swash plate 40;

TH1=tilt angle of first swash plate 30 in maximum capacity state shown in FIG. 8;

TH2=tilt angle of second swash plate 40 in maximum capacity state shown in FIG. 8;

TH3=tilt angle of first swash plate 30 in minimum capacity state shown in FIG. 7; and TH4=tilt angle of second swash plate 40 in minimum capacity state shown in FIG. 7.

By employing the tilt linking mechanism 70 constructed as described above, the piston motor 1 can vary the tilt angles of the two swash plates 30 and 40 using the single servo mechanism 33, without providing two servo mechanisms and a proportional electromagnetic pressure reducing valve.

Hence, similar favorable effects to those of the first embodiment can be obtained in this embodiment.

The contents of Tokugan 2007-68157, with a filing date of Mar. 16, 2007 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, this invention may also be applied to an opposing swash plate hydraulic pump.

INDUSTRIAL APPLICABILITY

As described above, according to this invention, the tilt angles of two swash plates provided in an opposing swash plate hydraulic motor or hydraulic pump can be controlled through a simple construction. Hence, when this invention is applied to an HST using an opposing swash plate hydraulic motor or hydraulic pump, a wide speed ratio range can be covered through a simple and compact construction.

The embodiments of this invention in which an exclusive property or privilege is claimed are defined as follows:

1. An opposing swash plate piston pump/motor in which a first swash plate and a second swash plate are disposed on either side of a cylinder block, a plurality of cylinders are disposed in the cylinder block on a circumference centering on a central axis of the cylinder block and parallel to the central axis of the cylinder block, a first piston and a second piston are inserted opposite to each other in each cylinder, the first piston slides on the first swash plate, and the second piston slides on the second swash plate such that the first piston and the second piston enlarge and reduce a respective volume within the respective cylinders, the piston pump/motor comprising:

a servo mechanism that tilts the first swash plate; and
   a tilt linking mechanism that tilts the second swash plate in conjunction with tilting of the first swash plate, comprising:
      a slide bar supported to be capable of displacing in only an orthogonal direction to a plane formed by the central axis of the cylinder block, a tilt central axis of the first swash plate, and a tilt central axis of the second swash plate;
      a first engagement pin that is fixed to the first swash plate in parallel with the tilt central axis of the first swash plate, the first engagement pin engaging the first swash plate with the slide bar so that the first swash plate is capable of rocking with respect to the slide bar and displacing in an axial direction of the slide bar; and
      a second engagement pin that is fixed to the second swash plate in parallel with the tilt central axis of the second swash plate, the second engagement pin engaging the second swash plate with the slide bar so that the second swash plate is capable of rocking with respect to the slide bar and displacing in the axial direction of the slide bar, the second engagement pin being disposed on an opposite side of the tilt central axis of the second swash plate to the cylinder block,
   wherein the slide bar
      engages with the first swash plate via a notch that holds the first engagement pin to be capable of displacing in the axial direction of the slide bar, and
      engages with the second swash plate via a notch that holds the second engagement pin to be capable of displacing in the axial direction of the slide bar.

2. An opposing swash plate piston pump/motor in which a first swash plate and a second swash plate are disposed on either side of a cylinder block, a plurality of cylinders are disposed in the cylinder block on a circumference centering on a central axis of the cylinder block and parallel to the central axis of the cylinder block, a first piston and a second piston are inserted opposite to each other in each cylinder, the first piston slides on the first swash plate, and the second piston slides on the second swash plate such that the first piston and the second piston enlarge and reduce a respective volume within the respective cylinders, the piston pump/motor comprising:

a servo mechanism that tilts the first swash plate; and
   a tilt linking mechanism that tilts the second swash plate in conjunction with tilting of the first swash plate, comprising:
      a slide bar supported to be capable of displacing in only an orthogonal direction to a plane formed by the central axis of the cylinder block, a tilt central axis of the first swash plate, and a tilt central axis of the second swash plate;
      a first engagement pin that engages the first swash plate with the slide bar so that the first swash plate is capable of rocking with respect to the slide bar; and
      a second engagement pin that engages the second swash plate with the slide bar so that the second swash plate is capable of rocking with respect to the slide bar, wherein
   the slide bar
      engages with the first swash plate via a notch that holds the first engagement pin to be capable of displacing in an axial direction of the slide bar, and
      engages with the second swash plate via a notch that holds the second engagement pin to be capable of displacing in the axial direction of the slide bar, the second engagement pin is disposed on an opposite side of the tilt central axis of the second swash plate to the cylinder block, and
      a ratio between a diameter of a displacement trajectory of the first engagement pin about the tilt central axis of the first swash plate and a diameter of a displacement trajectory of the second engagement pin about the tilt central axis of the second swash plate is set to be equal to an inverse of a ratio between a tilt angle range of the first swash plate and a tilt angle range of the second swash plate.

3. The opposing swash plate piston pump/motor as defined in claim 1, wherein
   the first engagement pin directly contacts the first swash plate, and
   the second engagement pin directly contacts the second swash plate.

4. An opposing swash plate piston pump or piston motor comprising:
   a cylinder block;
   first and second swash plates that are disposed on opposite sides of the cylinder block;
   a plurality of cylinders that are disposed in the cylinder block on a circumference centering on a central axis of the cylinder block, the cylinders being parallel to the central axis of the cylinder block;
   first and second pistons, the first pistons being inserted opposite to the second pistons in each cylinder, the first pistons sliding on the first swash plate, and the second pistons sliding on the second swash plate such that the first pistons and the second pistons enlarge and reduce a respective volume within the respective cylinders;
   a servo mechanism that tilts the first swash plate; and
   a tilt linking mechanism that tilts the second swash plate in conjunction with tilting of the first swash plate, the tilt linking mechanism including:
      a slide bar supported to be capable of displacing in only an orthogonal direction to a plane formed by the central axis of the cylinder block, a tilt central axis of the first swash plate, and a tilt central axis of the second swash plate;
      a first engagement pin that is fixed to the first swash plate so as to be parallel with the tilt central axis of the first swash plate, the first engagement pin engaging the first swash plate with the slide bar so that the first swash plate is capable of rocking with respect to the slide bar and displacing in an axial direction of the slide bar; and
      a second engagement pin that is fixed to the second swash plate in parallel with the tilt central axis of the second swash plate, the second engagement pin engaging the second swash plate with the slide bar so that the second swash plate is capable of rocking with respect to the slide bar and displacing in the axial direction of the slide bar, a ratio between a diameter of a displacement trajectory of the first engagement pin about the tilt central axis of the first swash plate and a diameter of a displacement trajectory of the second engagement pin about the tilt central axis of the second swash plate being set to be equal to an inverse of a ratio between a tilt angle range of the first swash plate and a tilt angle range of the second swash plate.

5. The opposing swash plate piston pump or piston motor of claim 4, wherein the slide bar engages with the first swash plate via a notch that holds the first engagement pin to be capable of displacing in the axial direction of the slide bar, and engages with the second swash plate via a notch that holds the second engagement pin to be capable of displacing in the axial direction of the slide bar.

6. The opposing swash plate piston pump or piston motor of claim 4, wherein the second engagement pin is disposed on an opposite side of the tilt central axis of the second swash plate to the cylinder block.

7. The opposing swash plate piston pump or piston motor of claim 4, wherein the first engagement pin directly contacts the first swash plate, and the second engagement pin directly contacts the second swash plate.

* * * * *